United States Patent
Nakai et al.

(12) 
(10) Patent No.: US 6,390,071 B1
(45) Date of Patent: May 21, 2002

(54) ENGINE COMPONENT LAYOUT FOR OUTBOARD MOTOR

(75) Inventors: Hiroshi Nakai; Masafumi Sogawa, both of Shizuoka (JP)

(73) Assignee: Sanshin Kogyo Kabushiki Kaisha, Shizuoka-ken (JP)

( * ) Notice: Subject to any disclaimer, the term of this patent is extended or adjusted under 35 U.S.C. 154(b) by 0 days.

(21) Appl. No.: 09/466,488

(22) Filed: Dec. 17, 1999

Related U.S. Application Data

(63) Continuation-in-part of application No. 09/145,912, filed on Sep. 2, 1998, now Pat. No. 6,112,726.

(30) Foreign Application Priority Data

Dec. 17, 1998 (JP) ............................................ 10-358496

(51) Int. Cl.[7] .............................................. F02M 37/04
(52) U.S. Cl. .................................. 123/509; 123/198 C
(58) Field of Search ................................. 123/509, 516, 123/198 C, 508, 495; 440/900, 84, 85, 87

(56) References Cited

U.S. PATENT DOCUMENTS

| | | | | |
|---|---|---|---|---|
| 4,811,717 A | * | 3/1989 | Nakahama ................... 123/509 |
| 5,450,831 A | * | 9/1995 | Fukuoka ...................... 123/509 |
| 5,562,510 A | | 10/1996 | Suzuki et al. | |
| 5,669,358 A | * | 9/1997 | Osakabe ...................... 123/509 |
| 5,755,603 A | | 5/1998 | Kumita | |
| 5,819,711 A | * | 10/1998 | Motose ........................ 123/516 |
| 5,855,197 A | * | 1/1999 | Kato ........................... 123/516 |
| 5,890,472 A | * | 4/1999 | Saito ........................... 123/516 |
| 5,943,996 A | * | 8/1999 | Sogawa et al. .............. 123/509 |
| 5,967,865 A | | 10/1999 | Nakamura et al. | |
| 5,992,392 A | * | 11/1999 | Saito ........................... 123/508 |
| 6,032,654 A | * | 3/2000 | Kato ........................... 123/509 |
| 6,070,564 A | * | 6/2000 | Hiraoka et al. ......... 123/198 R |
| 6,082,336 A | * | 7/2000 | Takahashi et al. .......... 123/508 |
| 6,112,726 A | * | 9/2000 | Saito et al. .................. 123/509 |

FOREIGN PATENT DOCUMENTS

JP           10306752        11/1998

* cited by examiner

*Primary Examiner*—Carl S. Miller
(74) *Attorney, Agent, or Firm*—Knobbe, Martens, Olson & Bear, LLP

(57) ABSTRACT

An outboard motor includes a cowling covering an internal combustion engine having a plurality of horizontally arranged cylinders. A high pressure fuel pump drive unit is arranged so as to be offset from the axes of the cylinders, at an upper end of the engine. The electrical system is provided on a first side of the engine body and a fuel system is provided on the opposite side of the engine body. Arranged as such, the components of the engine form a compact unit thus reducing the overall size of the cowling. Additionally, fuel lines and electrical conduits which connect the various components of the respective fuel and electrical systems are separated from each other.

26 Claims, 10 Drawing Sheets

ENGINE COMPONENT LAYOUT FOR OUTBOARD MOTOR

PRIORITY INFORMATION

This application is a Continuation-In-Part of U.S. patent application Ser. No. 09/145,912; Sep. 2, 1998 now U.S. Pat. No. 6,112,726, which claims priority to Japanese Patent Application Nos. 9-238118, 9-238508, and 9-238509, each of which were filed on Sep. 3, 1997, and also claims priority to Japanese Patent Application No. 10-358496 filed Dec. 17, 1998.

BACKGROUND OF THE INVENTION

1. Field of the Invention

The present invention is directed to an outboard motor for a watercraft, and more particularly to an arrangement of engine components of a marine outboard motor.

2. Description of the Related Art

There exists in all fields of engine design an increasing emphasis on obtaining more efficient emission control, better fuel economy and, at the same time, continued high or higher power output. Accordingly, two-stroke type internal combustion engines have recently become more popular for use in watercraft due to their relatively high specific output ratios (e.g., horsepower per cubic centimeter). However, there are certain objections to the use of two-stroke powered watercraft on some bodies of water. For example, environmental issues arise when two-stroke internal combustion engines are used on small bodies of water, due to the lubricants, unburnt fuel, and other byproducts that are often contained in two-cycle engine exhaust. These environmental concerns have raised a desire to minimize exhaustion of hydrocarbons and other exhaust byproducts (e.g., carbon monoxide and oxides of nitrogen), and thus reduce pollution of the atmosphere and the body of water in which the watercraft is operated.

These trends have resulted in the substitution of fuel injection systems for carburetors, as the chargeformer of two-stroke engines. In the commonly used systems, fuel is injected into an intake air manifold. In order to obtain still further improvement, direct injection systems are being considered. These systems inject fuel directly into the combustion chamber and may be accompanied by stratification or lean burning operation to further fuel economy and emission control.

Direct injection, however, requires that the pressure at which fuel is injected into the engine is higher than the pressure required for manifold injection systems. Fuel systems for direct injection thus must supply fuel to the fuel injectors at extremely high pressure in order to inject fuel into the corresponding combustion chambers as the combustion chambers reach their minimum volume (i.e., where the piston nears top dead center).

High pressure fuel pumps are typically employed for producing highly pressurized fuel for direct injection purposes. Conventionally, in V-type engines employed in outboard motors, a high pressure fuel pump used for direct injection purposes is directly driven by the crankshaft of the engine via a drive belt. However, high pressure fuel pumps and their drive units are large and are therefore typically mounted in the valley created between the cylinder banks which form the V-type engine.

In order to protect the internal combustion engine and to smooth the air flow over the engine, an upper cowling is typically mounted over the internal combustion engine of an outboard motor. Because outboard motors are often used at high speed, and since the upper portion of an outboard motor which contains the internal combustion engine oftentimes extends above the transom of the watercraft to which it is attached during operation, the shape of the upper cowling has a significant impact on the aerodynamics of the watercraft. Therefore, the upper cowling desirably is sized and shaped to fit tightly around the outer contours of the internal combustion engine and create a symmetric flow of air around the engine.

SUMMARY OF THE INVENTION

A need therefore exists for an outboard motor that includes a direct injection in-line engine that has a compact arrangement. It is desirable that the components of the engine are arranged so as to minimize the entanglement of the electrical conduits and fuel lines which connect the various components of the engine. Additionally, it is desirable that the engine of the outboard motor have a shape such that its frontal area is generally symmetric, so that an upper cowling can be made as small as possible.

According to one aspect of the invention, an outboard motor includes an in-line type, direct injected, two-stroke internal combustion engine having at least one cylinder, extending about a longitudinal axis, an electrical system arranged substantially on one side the longitudinal axis, and a fuel delivery system arranged substantially on a second side of the longitudinal axis, opposite the first side. By providing the fuel and electrical systems on opposite sides of the longitudinal axis of the cylinders, the present invention provides a simplified layout for an internal combustion engine of an outboard motor.

For example, the fuel system of an internal combustion engine includes several components connected by fuel lines. Similarly, the electrical system of an internal combustion engine has a number of components connected by electrical conduits. Conventionally, when such components have been installed on an engine, the fuel lines and electrical lines may be overlapped and intertwined with each other, thereby forming a complex component layout that is difficult to service. Additionally, because the internal combustion engines of outboard motors are covered by a removable cowling, essentially every component of the internal combustion engine is mounted directly or indirectly to the engine body. Mounted as such, the various components of the internal combustion engine and the engine body form a compact unit. However, by mounting the various components in such a manner, servicing of the engine becomes more complicated due to the tight spacing and intermingling of the fuel and electrical lines.

By arranging the fuel system and the electrical system on opposite sides of an internal combustion engine, the present component layout provides a compact power head and simplifies the arrangement of these engine components. For example, with the fuel and electrical systems arranged as such, the electrical conduits connecting the various components of the electrical system remain separated from the fuel lines which connect the various components of the fuel system. Therefore, servicing the electrical and fuel systems is simplified.

For example, when servicing a fuel or electrical system, it is necessary, when performing certain repairs, to trace the path of an electrical conduit or fuel line. If the electrical conduits and fuel lines are intertwined, it may be difficult to determine where the fuel lines or electrical lines lead. However, with the fuel and electrical systems arranged in accordance with the present invention, the pathways of the fuel lines and electrical conduits are more easily viewed when servicing the engine. Additionally, with the fuel delivery and electrical systems arranged on opposite sides of the engine, the components of each system can be closely spaced to each other, thus further compacting the engine's size. Additionally, the length of the electrical conduits and fuel lines are minimized, thereby reducing the cost of component materials.

Another advantage stemming from the separation of the fuel and electrical system is that the overall size of the engine is compact, thus allowing a tight-fitting cowling to be fit over the engine with little wasted space. As discussed above, since the upper portion or the powerhead of an outboard motor is subjected to significant airflow during operation, it is desirable to shape the upper cowling so as to minimize aerodynamic drag. Thus, it is desirable to minimize the frontal area of the cowling.

In order to provide optimal airflow around the upper cowling, the cowling also is desireably symmetric. If an engine component extends laterally outwardly from one side of the engine, requiring a projection to be formed on the cowling to extend around the projecting component, an identical projection would be formed on the opposite side of the cowling so that the airflow around the cowling is symmetric. It thus is important to arrange the components of the internal combustion engine symmetrically around the engine body. By providing the fuel system on one side of the engine body and the electrical system on the opposite side, the resulting engine layout can be made generally symmetric with respect to the longitudinal axes of the cylinders. A tight fitting cowling thus can be fit over the engine with little space wasted.

Further aspects, features, and advantages of the present invention will become apparent from the detailed description of the preferred embodiments which follow.

BRIEF DESCRIPTION OF THE DRAWINGS

The above-mentioned and other features of the invention will now be described with reference to the drawings of preferred embodiments of the present outboard motor. The illustrated embodiments of the outboard motor are intended to illustrate, but not to limit the invention. The drawings contain the following figures:

FIG. 3 is a right side elevational view of the engine, viewed along arrow A shown in FIG. 2, as;

DETAILED DESCRIPTION OF THE PREFERRED EMBODIMENTS

An improved internal combustion engine layout for an outboard motor is disclosed herein. The engine includes an improved layout for the components of a direct injected, in-line internal combustion engine provided on an outboard motor, which provides compact outer dimensions of the engine. Thus, the layout of the engine is simplified while improving the aerodynamics of the outboard motor.

Figure 1:
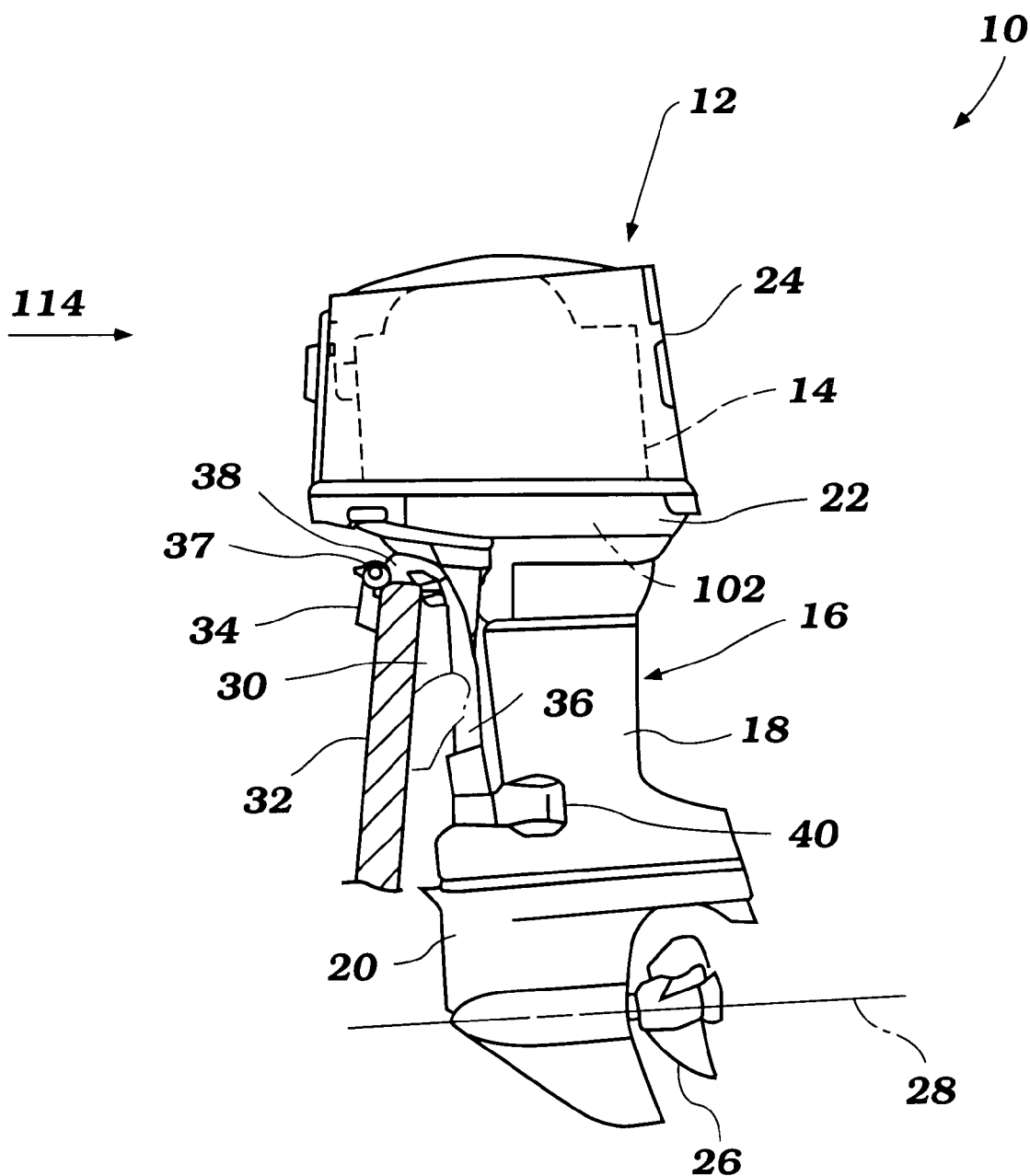
FIG. 1 is a side elevational view of an outboard motor which can embody an engine (shown in phantom) that is configured in accordance with one aspect of the present invention, the outboard motor being mounted to the transom of a watercraft (shown partially)

With reference to FIG. 1, an outboard motor constructed in accordance with the present invention is identified generally by the reference numeral 10. The outboard motor is comprised of a powerhead indicated generally by the reference numeral 12, which is comprised of an internal combustion engine 14, shown in phantom, and is mounted to the upper end of a propulsion unit 16.

The propulsion unit 16 includes a driveshaft housing 18 and a lower unit 20, which may be formed integrally or with two separate parts. The illustrated embodiment shows the driveshaft housing 18 as being separate from the lower unit 20. Typically, the driveshaft housing 18 is formed as a casting from a lightweight material such as aluminum or an aluminum alloy. The lower unit 20 is provided at the lower end of the driveshaft housing 18.

The engine 14 in the illustrated embodiment, is a direct injected, in-line, three cylinder, two-stroke crankcase compression type. This engine type, however, is merely exemplary. Those skilled in the art will readily appreciate that the present invention can be practiced with a variety of other engine types having other numbers of cylinders, having other cylinder configurations, and operating on other combustion principles (e.g., four-stroke and rotary principles).

The engine 14 is supported on a lower tray 22 which forms a portion of the protective cowling that encircles and protects the engine 14. The cowling is completed by an upper cowling member 24 which is detachably affixed to the tray 22 in a known manner.

The engine 14 is oriented in the powerhead 12 so that its output shaft rotates about a generally vertically extending axis. The output shaft, not shown, is coupled in a known manner to a driveshaft (not shown) that depends through the driveshaft housing 18 and into the lower unit 20. The driveshaft is journaled in any suitable manner. At its lower end, the driveshaft is coupled to a forward neutral reverse transmission (not shown). The driveshaft terminates in a gear set which transmits toque from the vertically extending driveshaft to the horizontally extending impeller shaft (not shown).

The engine 14 preferably is water-cooled and the water for its cooling system is drawn from the body of water in which the outboard motor 10 is operating. The cooling water is admitted through a water inlet opening formed in the lower unit 20. A water pump (not shown) is mounted at the interface between the drive shaft housing 18 and the lower unit 20 and is driven by the driveshaft in a known manner. The water pump draws water through the inlet and delivers it upwardly to the engine 14 through a water supply conduit.

The transmission, of which the details are not shown, is controlled in a known manner by a shift rod which is journaled for rotatable support in the lower unit 20. The shift rod is connected to a shift cam for actuation of the transmission in a known manner. The transmission couples the drive shaft to a propeller shaft on which the propeller 26 is affixed so as to rotate about a propeller axis 28 in a known manner. The preferred embodiment illustrates an outboard motor with a propeller shaft and conventional propeller 26. Nevertheless, any propulsion device can be utilized with the present invention.

Figure 2:
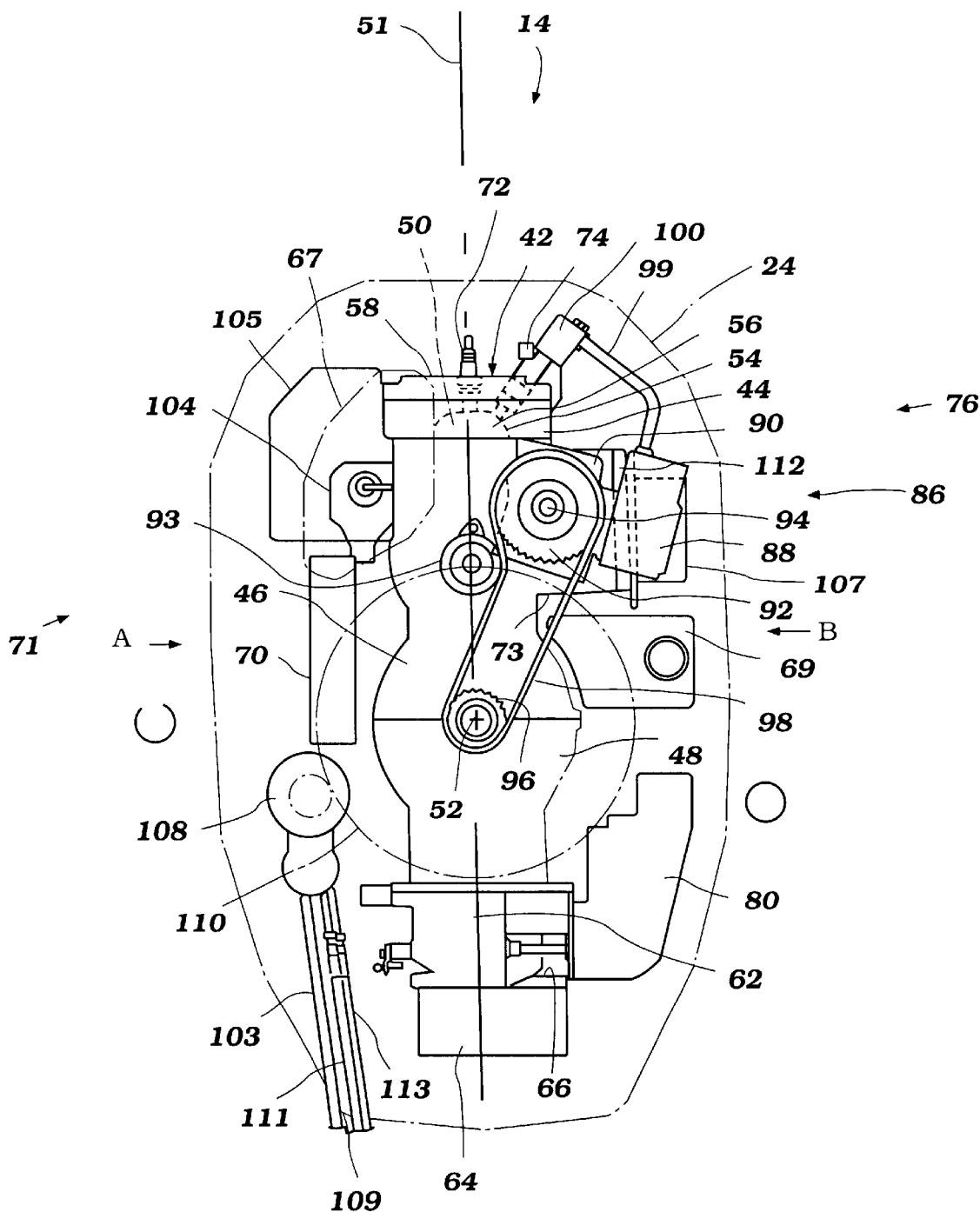
FIG. 2 is a top plan view of an engine constructed in accordance with an embodiment of the present invention, with an upper cowling of the outboard motor shown in phantom.

With reference to FIGS. 1 and 2, the engine 14 discharges exhaust gases through an exhaust manifold 73 and down into a silencing arrangement provided with an internal cavity in the driveshaft housing 18 through an exhaust pipe (not shown). The exhaust pipe extends into an expansion chamber formed at the rear of the driveshaft housing, also not shown. The expansion chamber terminates at its lower end in an exhaust gas discharge formed in the lower unit 20 for delivering the exhaust gases to the atmosphere, through the body of water in which the associated watercraft is operating. Although the preferred embodiment illustrates an exhaust passage through the hub, any type of conventional above-the-water exhaust gas discharge may be used with the present invention. For example, the exhaust discharge may include an underwater, high speed exhaust gas discharge and an above the water, low speed exhaust gas discharge.

As shown in FIG. 1, the outboard motor 10 also includes a clamping bracket 30 which is adapted to engage the rear of the transom 32 of an associated watercraft. A clamping device 34 such as a "transom screw" is also carried by the clamping bracket 30 and cooperates to affix the clamping bracket 30 to the transom 32 in a well known manner.

A swivel bracket 36 is affixed for pivotal movement with respect to the clamping bracket 30 by means of a horizontally extending pivot pin 37. The pivotal connection permits tilt and trim movement of the outboard motor 10 relative to the hull of the associated watercraft, as is well known in the art. The powerhead 12, driveshaft housing 18, and the lower unit 20 are connected to the swivel bracket 36 by a steering bracket 38 in a well known manner. A steering shaft is connected to the steering bracket 38 and extends through the swivel bracket 36 to a bracket 40 for rotating the outboard motor 10 to steer the watercraft, in a well known manner.

The details of the construction of the outboard motor 10 and the components which are not illustrated may be considered to be conventional or of any type known to those wishing to utilize the invention disclosed herein. Those skilled in the art can readily refer to any known constructions with which to practice the invention.

With reference to FIG. 2, the illustrated embodiment of the engine 14 is comprised of an engine body 42 having a cylinder head 44, a cylinder block 46, and a crankcase 48. The cylinder block includes three-vertically spaced, horizontally extending cylinder bores 50, each defining a longitudinal axis 51. Arranged as such, a vertically extending plane (not shown) passes through the axes 51 of the cylinder bores 50, and thus falls between the left and right sides of the engine body 42, as viewed in FIG. 2. Pistons (not shown) reciprocate in the cylinder bores 50, along the longitudinal axis 51 of each cylinder bore 50. The pistons are, in turn, connected to the upper or small ends of a connecting rod, also not shown. The big ends of these connecting rods are journaled on the throws of a crankshaft 52 in a manner that is well known in the art. In the illustrated embodiment, the crankshaft 52 forms the output shaft of the engine 14.

The crankshaft 52 is journaled in a suitable manner for rotation within the crankcase which is formed by a lower end of the cylinder block 46 and the crankcase member 48. The crankcase member 48 is fixed to the cylinder block 46 in a suitable manner. As is typical with two-cycle engines, the crankshaft 52 and the crankcase are provided with seals (not shown) so that each section of the crankcase that is associated with one of the cylinder bores 50 is sealed from the other sections. This type of construction is well known in the art.

The cylinder head assembly 42 is affixed to an end of the cylinder block 46 that is spaced from the crankcase member 48. The cylinder head 44 includes a plurality of recesses 54 in its inner face. Each of these recesses 54 cooperate with the respective cylinder bore 50 and the head of the piston to define combustion chambers 56 of the engine 14, as is well known in the art. A cylinder head cover member 58 covers the cylinder head 44.

Figure 3:
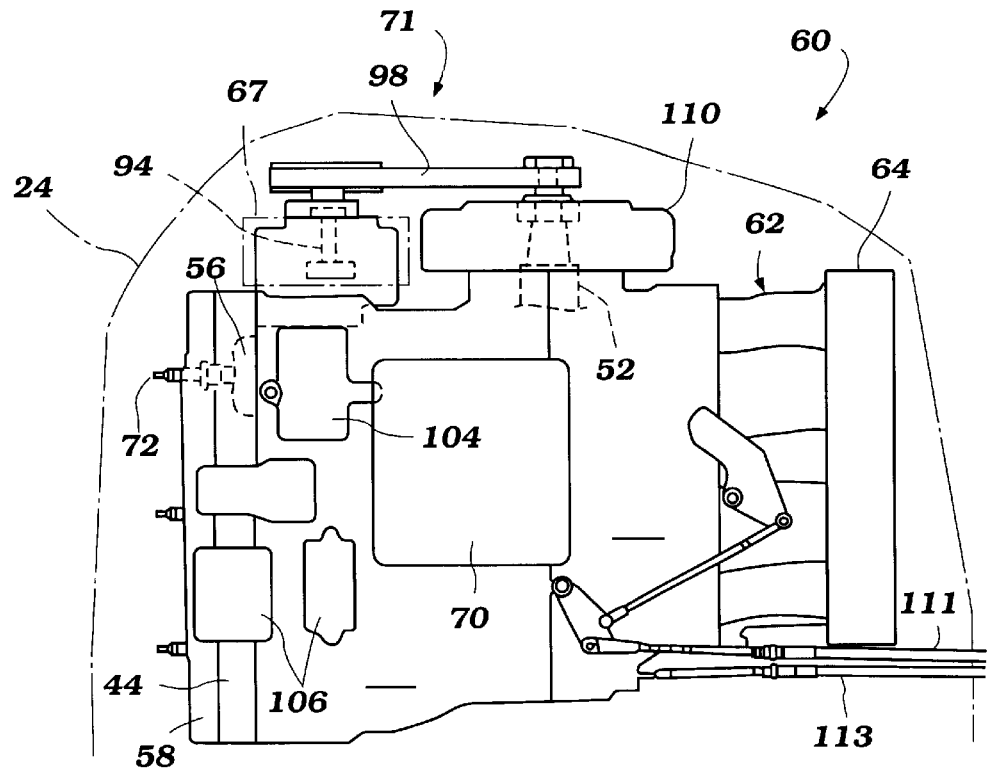

As shown in FIGS. 2 and 3, an air induction system, indicated generally by the reference numeral 60, is provided for delivering an air charge to the sections of the crankcase chamber associated with each of the cylinder bores 50. This communication is via an intake manifold 62 communicating with the crankcase member 48 and registering with each crankcase chamber section.

The induction system 60 includes an air silencing and inlet device, shown schematically in FIG. 3 and is indicated by the reference numeral 64. As shown in FIGS. 2 and 3, the inlet device is contained within the cowling end thereof and has a rearwardly facing air inlet opening 66 through which air is introduced. Air is admitted into the interior of the cowling 24 in a known manner, and this is primarily through at least one rearwardly positioned air inlet 67 that has a construction as is generally well known in the art.

The air inlet device 64 supplies the induced air into a plurality of throttle bodies which, in the illustrated embodiment, are formed integrally with the intake manifold 62. Each throttle body includes a throttle valve, which may be formed as a butterfly-type valve. The throttle valves are linked to each other for simultaneous opening and closing of the throttle valves in a manner that is well known in the art.

As is also typical in two-cycle engine practice, reed-type check valves (not shown) control the induction of air from the intake manifold 62 into the crankcase. These check valves permit the air to flow into the sections of the crankcase chamber when the pistons are moving upwardly in their respective cylinder bores 50. However, as the pistons move downwardly, the charge will be compressed in the sections of the crankcase chamber. At that time, the reed-type check valve will close so as to cause the charge to be compressed. In addition, a lubricant pump 68 is provided for spraying lubricant stored in a lubricant tank 69, into the crankcase and/or the throttle body for engine lubrication, possibly under the control of an ECU (electronic control unit) 70. Although it is not shown, some forms of direct lubrication may also be employed for delivering lubricant directly to certain components of the engine 14.

The charge which is compressed in the sections of the crankcase chamber is then transferred to the combustion chamber through a scavenging system (not shown) in a manner that is well known.

A spark plug 72 is mounted in the cylinder head 44 for each cylinder bore 50. The spark plug 72 is fired under the control of the ECU 70. The ECU 70 receives certain signals for controlling the time of firing the spark plug 72 in accordance with any desired control strategy.

The spark plug 72 ignites a fuel air charge that is formed by mixing fuel directly with the intake air via a fuel injector 74. The fuel injectors 74 are solenoid-type injectors and are electrically operated. They are mounted directly into the cylinder head 44 so as to provide optimum fuel vaporization under all running conditions.

Fuel supplied to the fuel injector 74 by a fuel supply system, indicated generally by the reference numeral 76 and which will be described first by reference to FIG. 2. The fuel supply system 76 is composed of a main fuel supply tank (not shown) that is provided in the hull of the watercraft with which the outboard motor 10 is associated. Fuel is drawn from this tank through a conduit by a first low pressure pump 78. The lower pressure fuel pump 78 is a diaphragm type pump operated by variations in pressure in the sections of the crankcase chamber, and thus delivering fuel under a relatively low pressure.

From the low pressure pump 78, fuel is supplied to a vapor separator 80. The fuel is supplied through a fuel line 82 and a float valve (not shown) regulates the fuel flow through the line 82. The float valve is operated by a float disposed within the vapor separator 80 in a known manner.

A high pressure electric fuel pump 84 is provided within the vapor separator 80 and pressurizes fuel that is delivered through a supply line (not shown) to a high pressure pumping apparatus, indicated generally by the reference numeral 86. The electric fuel pump 84, which is driven by an electric motor, develops a pressure such as 3 to 10 kg/cm$^2$, and functions as a pre-pressure pump. A low pressure regulator (not shown) is used to limit the pressure that is delivered to the high pressure pumping apparatus 86 by dumping the fuel back to the vapor separator 80.

The high pressure fuel delivery system 86 includes a high pressure fuel pump 88 that can develop a pressure of, for example, 50–100 kg/cm$^2$ or more. A pump drive unit 90 is provided for driving the high pressure fuel pump 88 which is mounted to the pump drive unit 90 with a plurality of bolts.

As shown in FIG. 2, a pulley 92 is affixed to an input shaft 94 of the pump drive unit 90. The pulley 92 is driven by a drive pulley 96 affixed to the crankshaft 52, via a drive belt 98. A tensioner 93 is rotatably mounted to the engine body 42 so as to maintain tension in the drive belt 98. The pump input shaft 94 is provided with a cam disk extending horizontally for pushing plungers which are disposed in the high pressure fuel pump 88.

Fuel supplied from the high pressure fuel pump 88 to a fuel supply pipe 99. The fuel pipe 99 is connected to a fuel rail 100 which extends vertically along the cylinder head 44. The fuel rail 100 delivers the pressurized fuel to each of the fuel injectors 74.

The pressure in the high pressure delivery system 76 is regulated by a high pressure regulator (not shown) which dumps fuel back to the vapor separator 80 through a pressure relief line in which a fuel heat exchanger or cooler desirably is provided.

After the fuel charge has been formed in the combustion chamber 56 by the injection of fuel from the fuel injector 74, the charge is ignited by firing the spark plugs 72, as noted above. The injection timing and duration, as well as control for the timing of firing of spark plugs 72, are controlled by the ECU 70.

Once the charge burns and expands, the pistons will be driven downwardly in the cylinder bores 50 until the pistons reach the lowermost position. At this time, an exhaust port (not shown) will be uncovered so as to open the communication with the exhaust manifold 73 formed in the cylinder block 46.

With reference to FIG. 2, the exhaust gases flow through the exhaust passages to collector sections of the exhaust manifold 73. These exhaust manifold collector sections communicate with the exhaust passages formed in an exhaust guide plate 102 (FIG. 1) on which the engine 14 is mounted.

Any type of desired control strategy can be employed for controlling the time and duration of fuel injection from the injectors 74 and timing of the firing of the spark plugs 72. It is to be understood that those skilled in the art will readily understand how various control strategies can be employed in conjunction with the components of the invention.

The control for the fuel air ratio preferably includes a feedback control system. Thus, a combustion condition sensor, such as an air fuel ratio sensor box 104, is provided that senses the in-cylinder combustion conditions by sensing the air fuel ratio of the fuel air mixture delivered to the cylinder bores 50. For example, the sensor box 104 may be in the form of an oxygen sensor which senses the in-cylinder combustion product conditions by sensing the residual amount of oxygen in the combustion products at a time near the time when the exhaust port is open. An output signal produced by the sensor box 104 is directed to the ECU 70 by an electrical conduit (not shown). Engine load, as determined by a throttle angle of a throttle valve contained in the induction system 60, is sensed by a throttle position sensor (not shown) which outputs a throttle position or a load signal to the ECU 70 via an electrical conduit (not shown). Preferably, there is also provided a pressure sensor (not shown) communicating with the fuel line 99. This pressure sensor outputs a high pressure fuel signal to the ECU 70 via an electrical conduit (not shown).

There also may be provided a water temperature sensor which outputs a cooling water temperature signal to the ECU 70 via an electrical conduit (not shown). Further, an intake air temperature sensor may be provided to generate and direct an intake air temperature signal to the ECU 70 (via an electrical conduit).

There is also provided a crank angle position sensor (not shown) associated with the crankshaft 52, which when measuring crank angle versus time, outputs an engine speed signal to the ECU 70 via an electrical conduit (not shown).

Conditions sensed by the various sensors are merely some of those conditions which may be sensed for engine control and it is, of course, practicable to provide other sensors such as, for example, but without limitation, an engine height sensor, a trim angle sensor, a knock sensor, a neutral sensor, a watercraft pit sensor, and an atmosphere temperature sensor in accordance with various control strategies.

Figure 4:
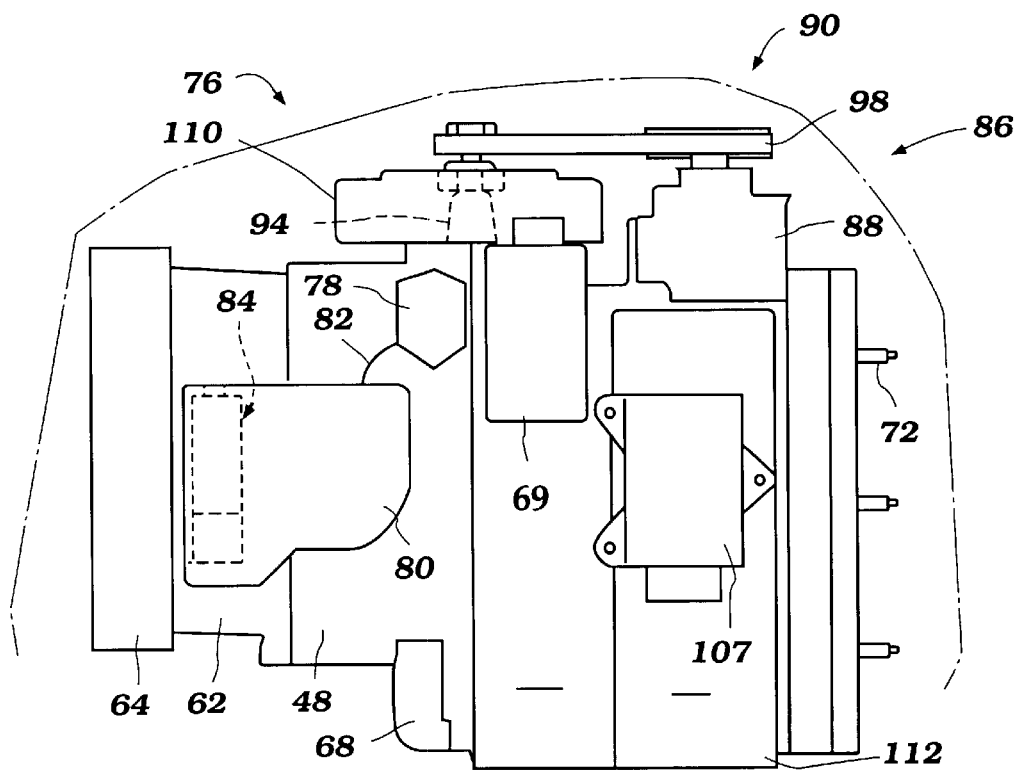
FIG. 4 a left side elevational view of the engine, viewed along arrow B shown in FIG. 2.

The ECU 70, as has been noted, outputs signals to the fuel injectors 74, spark plugs 72, the lubrication pump 68, and the high pressure electric fuel pump 84 for their respective control. These control signals are carried by respective control lines which are not shown in the figures, however, but which are well known in the art. Alternatively, as shown in FIG. 4, a separate fuel injector driver 106 may be provided for driving the fuel injector 74, in a well known manner.

As shown in FIG. 3, the electrical system 71 generally includes the ECU 70 as well as other various electrical components. For example, the electrical system 71 also includes the sensor box 104 and a plurality of relays 106. Preferably, the relays are contained in a splash-proof box 105 mounted to the engine body 42, which is well known in the art.

With reference to FIG. 2, the relay boxes 106 are provided for selectively delivering power, in the form of electric current, for various engine operations, such as, for example, but without limitation, powering a starter motor 108, or recharging a battery (not shown). An electrical conduit, such as an electrical cable 103 passes through the upper cowling 24 through a cable insertion port 109. The cable insertion port 109 preferably is arranged on the left side of the longitudinal axis 51, as viewed in FIG. 2. The electrical conduit may be connected to the various components of the electrical system 71, such as, for example, but without limitation, the relay box 105 and the ECU 70. Although not considered part of the electrical system 71, the starter motor 108 may also be connected directly to the electrical cable 103.

A throttle cable 111 and a shift cable 113 preferably enter the upper cowling 24 through the cable insertion port 109. The throttle cable is connected to the throttle body for controlling the position of the throttle valves in a known manner. Similarly, the shift cable 28 controls the operation of the transmission in a known manner.

As shown in FIG. 2, the starter motor 108 is mounted adjacent a flywheel 110 which is connected to the crankshaft 52. The flywheel 110 desireably forms, at least in part, a magneto generator which supplies electrical energy to the electrical system 71, in a known manner. Preferably, the flywheel 110 includes teeth formed on the outer peripheral edge of the flywheel, thereby forming a ring gear. The flywheel 110 preferably is arranged below the gear 96 and the tensioner 93. In operation, the starter motor 108 may be engaged by the operator to rotate the crankshaft 52 to start the engine 14.

As disclosed above, the various components of the electrical system 71 are connected via electrical conduits (not shown) for controlling the various aspects of engine operation and control. As shown in FIG. 2, the electrical system 71 is disposed substantially on the left side, as viewed in FIG. 2, of the longitudinal axes 51 of the cylinder bores 50. As shown in FIG. 3, the ECU 70, the sensor box 104, and the relay boxes 106 are mounted directly to the cylinder block 46. The electrical conduits (not shown) connecting each of the components of the electrical system are therefore generally confined to the left side of the engine, as viewed in FIG. 2.

As shown in FIG. 4, the fuel delivery system 76 includes the low pressure fuel pump 78, vapor separator 80, high pressure electric fuel pump 84, the high pressure fuel pump 88, the fuel pipe 99, and the fuel rail 100. Optionally, the fuel delivery system 76 may include a separate fuel injector driver 106. As disclosed above, the fuel delivery system 76 is connected via a plurality of fuel lines (not shown) which have been omitted. However, such fuel lines are well known in the art and therefore, a further description of the fuel line connections between the various components of the fuel delivery system 76 is not believed to be necessary to practice the present invention.

As shown in FIG. 4, the low pressure fuel pump 78, the vapor separator 80 and the high pressure electric fuel pump 84 are mounted to the crankcase member 48. The high pressure fuel pump 88 and the fuel injector driver 106 are mounted to the cylinder block 46. Optionally, the fuel injector driver 106 may be mounted to an outer cover member 112 which forms a cover over the exhaust manifold 73. However, the outer cover member 112 and the exhaust manifold 73 may be positioned on the opposite side of the longitudinal axis 51.

As shown in FIG. 2, the fuel delivery system 76 is arranged substantially on the right side of the longitudinal axis 51, as viewed in FIG. 2. Arranged as such, the fuel delivery system 76 is arranged on a side of the engine body 42 generally opposite from the side of the engine body 42 on which the electrical system 71 is mounted. Arranged as such, the engine 14 forms a compact unit within the powerhead 12. This is particularly useful in the arrangement within an outboard motor 10 because the compact arrangement allows the upper cowling 24 to be shaped with the smallest frontal area possible. By minimizing the frontal area of the upper cowling 12, the aerodynamic drag produced by the outboard motor 10 is minimized.

For example, during operation, and as shown in FIG. 1, the powerhead 12 of the outboard motor 10 extends above the transom 32 of the watercraft with which the outboard motor 10 is used. Positioned as such, the powerhead 12, depending on the type of watercraft, is exposed to a significant airflow, such as airflow 114. Therefore, by minimizing the frontal area of the upper cowling 12, the aerodynamic drag caused the impact of the air flow 114 upon the upper cowling 12 is minimized.

Furthermore, in order to balance the aerodynamic forces acting upon the upper cowling 24, the shape of the upper cowling 24, as viewed in top plan (FIG. 2), desireably is substantially symmetric. For example, as shown in FIG. 2, the outer periphery of the upper cowling 24 is generally symmetric with respect to the longitudinal axis 51 of the cylinder bores 50. Therefore, as the air flow 114 flows around the upper cowling 24, the aerodynamic forces are generally in balance. Consequently, the size of the engine components mounted to the sides of the engine body 42 generally dictate the size and shape of the upper cowling 24. Therefore, by arranging the fuel delivery system 76 on a side of the engine body 42 opposite the side on which the electrical system 71 is arranged, the present invention provides a compact engine 14 which minimizes the outer dimensions of the upper cowling 24.

As shown in FIG. 2, the drive unit 90 for driving the high pressure fuel pump 88 is arranged at a position offset from the longitudinal axis 51 of the cylinder bores 50. As is apparent from the various figures, the overall size of the high pressure fuel pump 88 and the drive unit 90 is quite large. In the embodiment of FIGS. 2–10, the drive unit 90 is arranged offset from the longitudinal axis 51 and is mounted to the cylinder block 46. As such, since the high pressure fuel pump is attached directly to the drive unit 90, the high pressure fuel pump 88 is in close proximity to the fuel rail 100, thereby forming a compact arrangement with the engine body 42.

Figure 5:
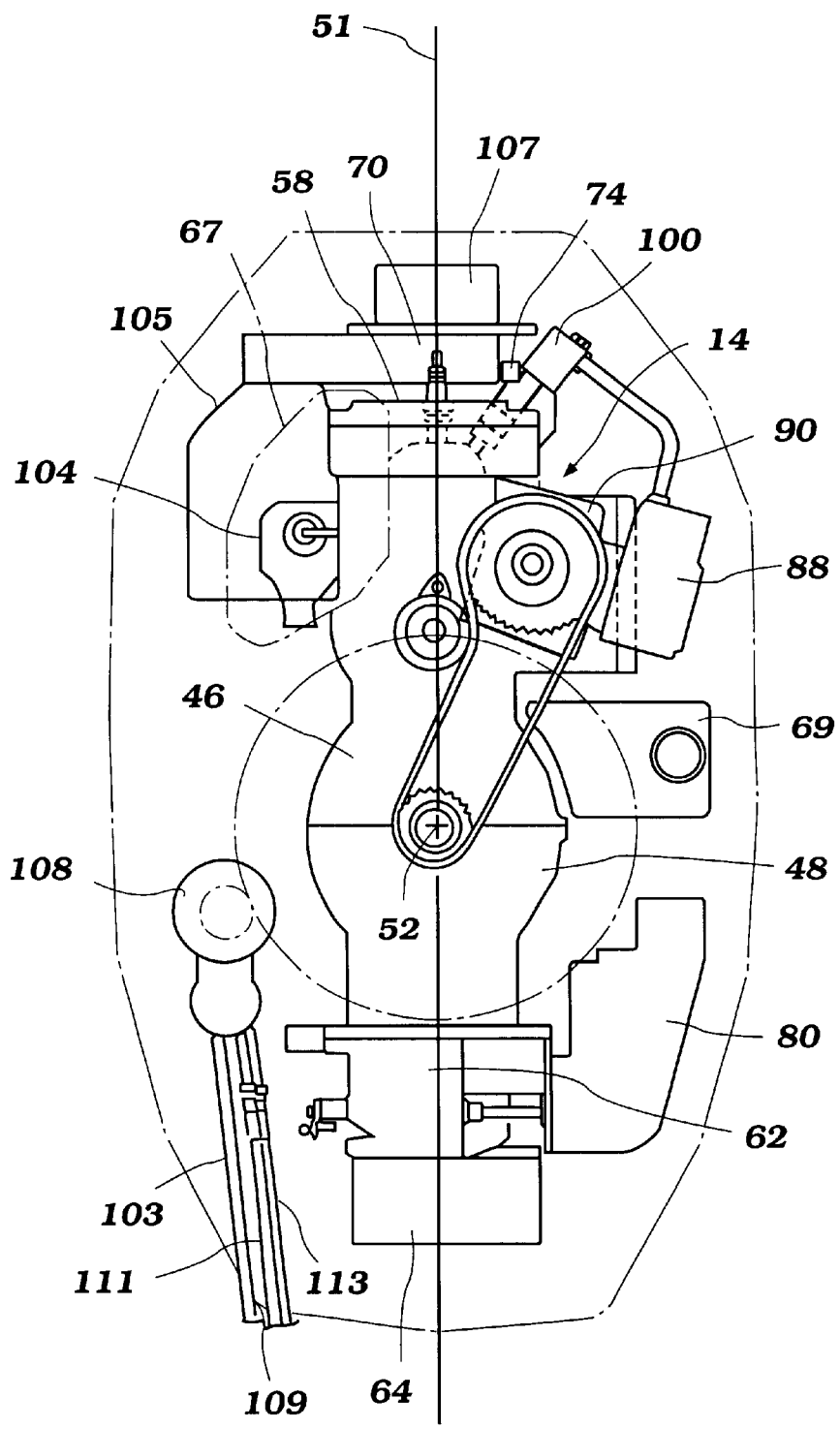
FIG. 5 is a top plan view illustrating a variation of the embodiment shown in FIG. 2.

With reference to FIG. 5, an alternative arrangement in accordance with the embodiment of FIG. 2 is shown therein. As shown in FIG. 5, the electrical system 71 and the fuel delivery system 76 are arranged in accordance with the embodiment shown in FIG. 2. In particular, the electrical system 71 is arranged substantially on a side of the longitudinal axis 51 opposite the side of the longitudinal axis 51 on which the fuel delivery system 76 is provided. Although the position of nearly all the components shown in FIG. 5 are identical to the position indicated in FIG. 2, the ECU 70 is arranged at a position rearward from the spark plug 72. As shown in FIG. 5, although a portion of the ECU 70 extends over the longitudinal axis 51, the electrical system 71 remains substantially on the left side of the longitudinal axis 51, as viewed in FIG. 5.

Arranged as such, the ECU 70 remains in close spacing with the other various components of the electrical system 71. Additionally, with the ECU 70 mounted behind the spark plug 72, the ECU 70 remains in close spacing with the relay boxes 106, as well as the spark plug 72 and the fuel injector 74. Therefore, the electrical conduits connecting the various components of the electrical system 71 do not interfere or become entangled with the fuel lines connecting the various components of the fuel delivery system 76.

Figure 6:
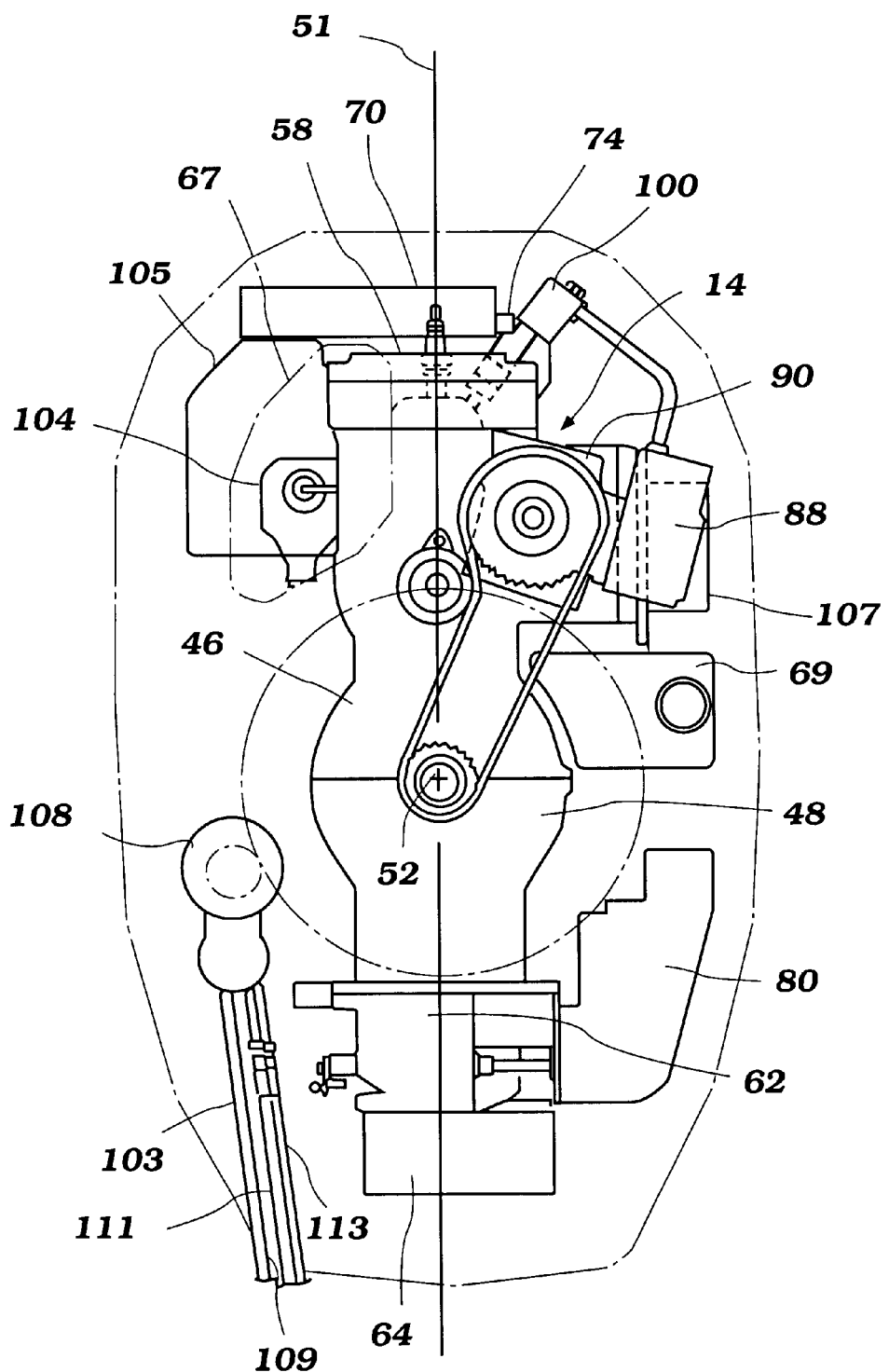
FIG. 6 is a top plan view illustrating a further variation of the embodiment shown in FIG. 2.

With reference to FIG. 6, a further alternative to the arrangement shown in FIG. 2 is illustrated therein. The arrangement of the electrical system 71 and the fuel system 76 shown in FIG. 6 is essentially identical to that shown in FIG. 5. However, the location of the fuel injection driver 107 has been moved to a position rearward from the ECU 70. In addition to the advantages of the arrangement shown in FIGS. 2 and 5, the arrangement shown in FIG. 6 further simplifies the layout of engine 14 in that the fuel injection driver 107 is closer to the fuel injector 74. Furthermore, since there are no fuel lines communicating with the fuel injection driver 107, electrical conduits connecting the ECU 70, the fuel injection driver 107 and any other various components of the electrical system 71 are not further entangled with fuel lines which connect the various components of the fuel delivery system 76.

Figure 7:
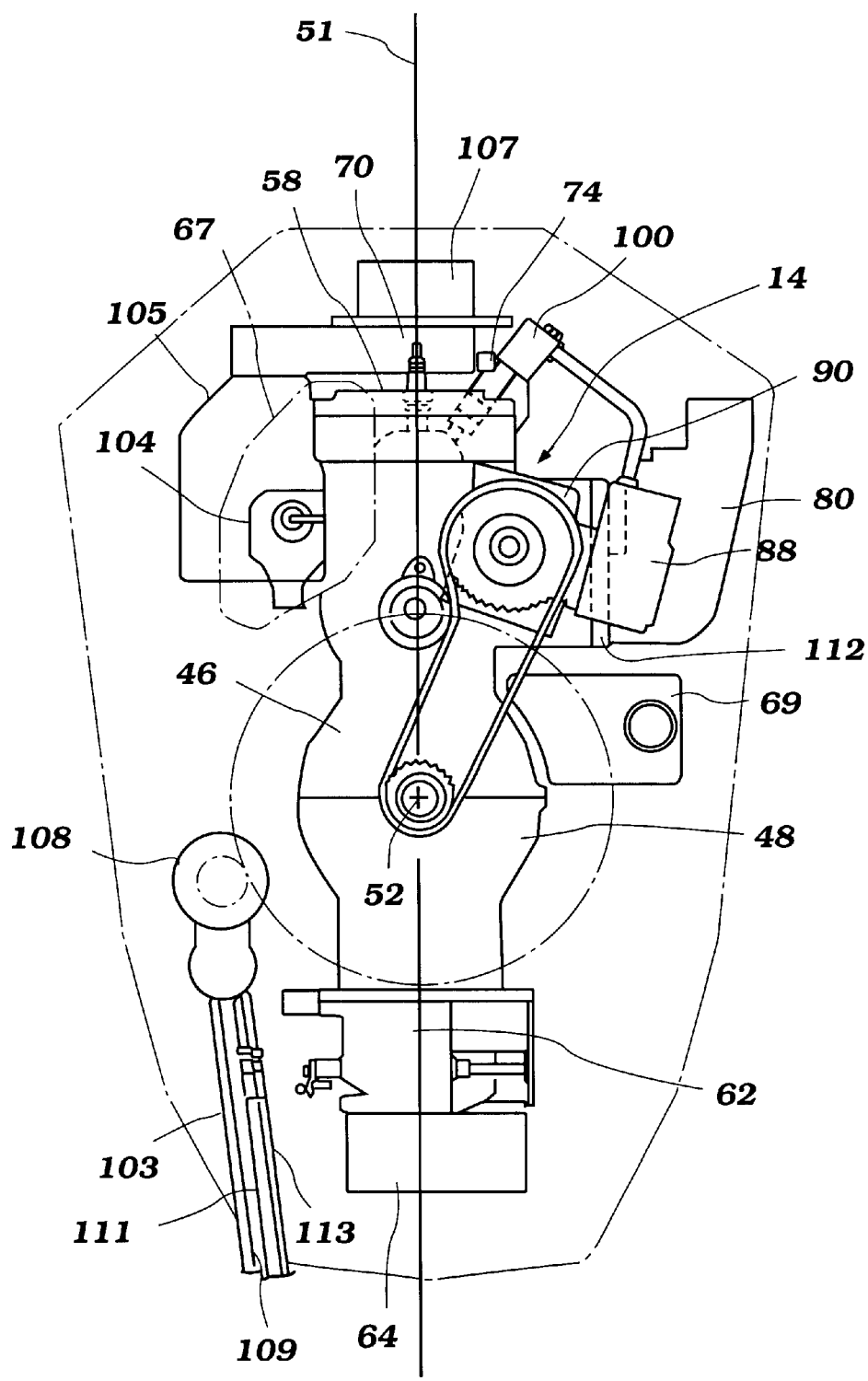
FIG. 7 is a top plan view illustrating an additional variation of the embodiment shown in FIG. 2.

With reference to FIG. 7, a further modification of the engine layout shown in FIG. 2 is illustrated. The engine layout shown in FIG. 7 is essentially identical to the layout shown in FIG. 6. However, in the layout shown in FIG. 7, the fuel vapor separator 80 is positioned beneath the high pressure fuel pump 88. Arranged as such, the fuel lines connecting the various components of the fuel delivery system 76 extend over shorter distances than in the layout shown in FIG. 6. However, since the fuel vapor separator 80 increases the width of the rear portion of the engine, a wedge-shape upper cowling 120 desirably is used to cover the engine 14 shown in FIG. 7. As shown in FIG. 7, the wedge-shaped upper cowling 120 has a forward end 122 that is narrower than a rear end 124. The increased width of the engine 14 created by the arrangement of the vapor separator 80 at the rear of the engine is therefore accommodated within the wedge-shaped upper cowling 120.

Figure 8:
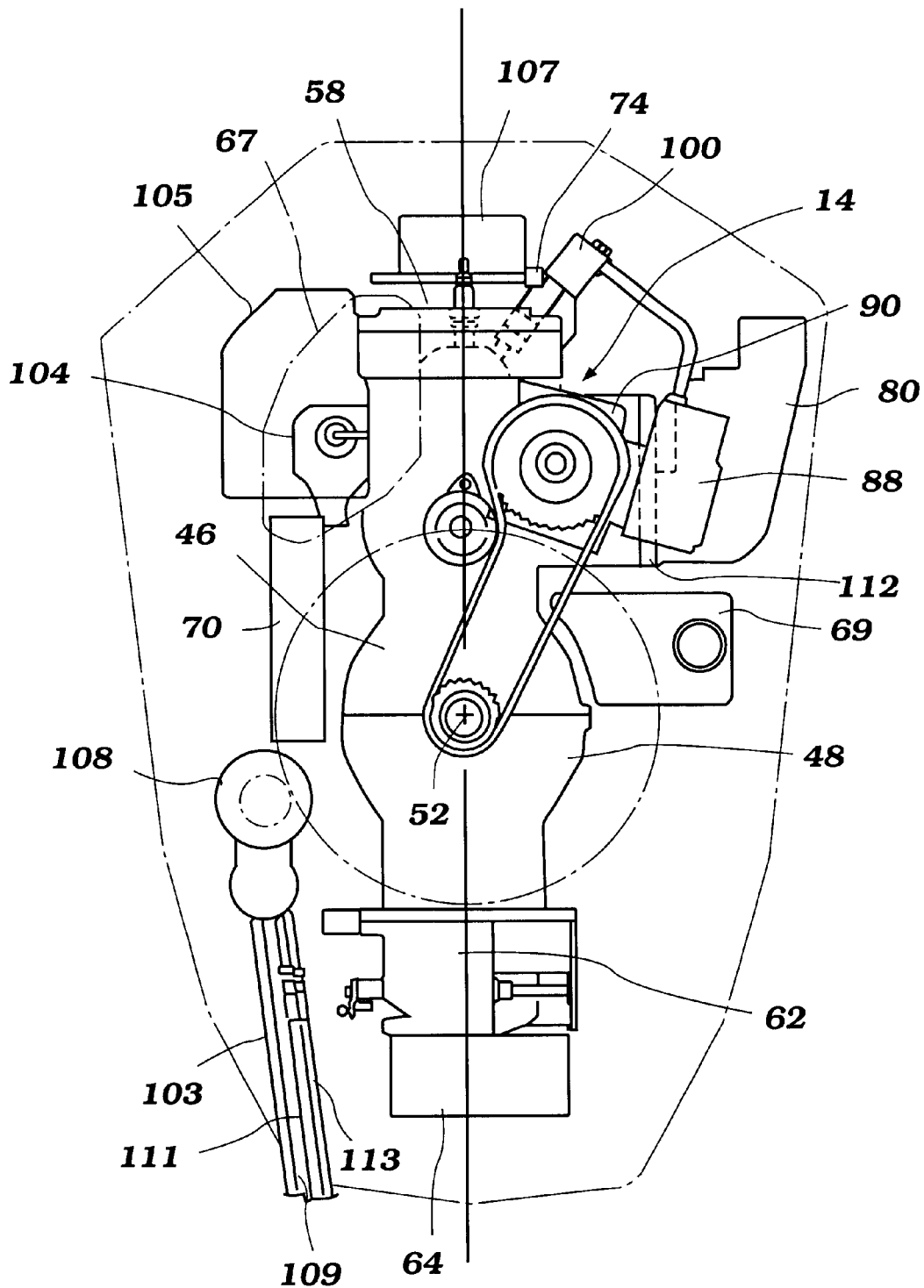
FIG. 8 is a top plan view illustrating another variation of the embodiment shown in FIG. 2.

With reference to FIG. 8, a modification of the engine layout shown in FIG. 7 is illustrated therein. The engine layout illustrated in FIG. 8 is essentially identical to the layout shown in FIG. 7. However, in the layout illustrated in FIG. 7, the ECU 70 is arranged in the same position shown in FIG. 2.

Figure 9:
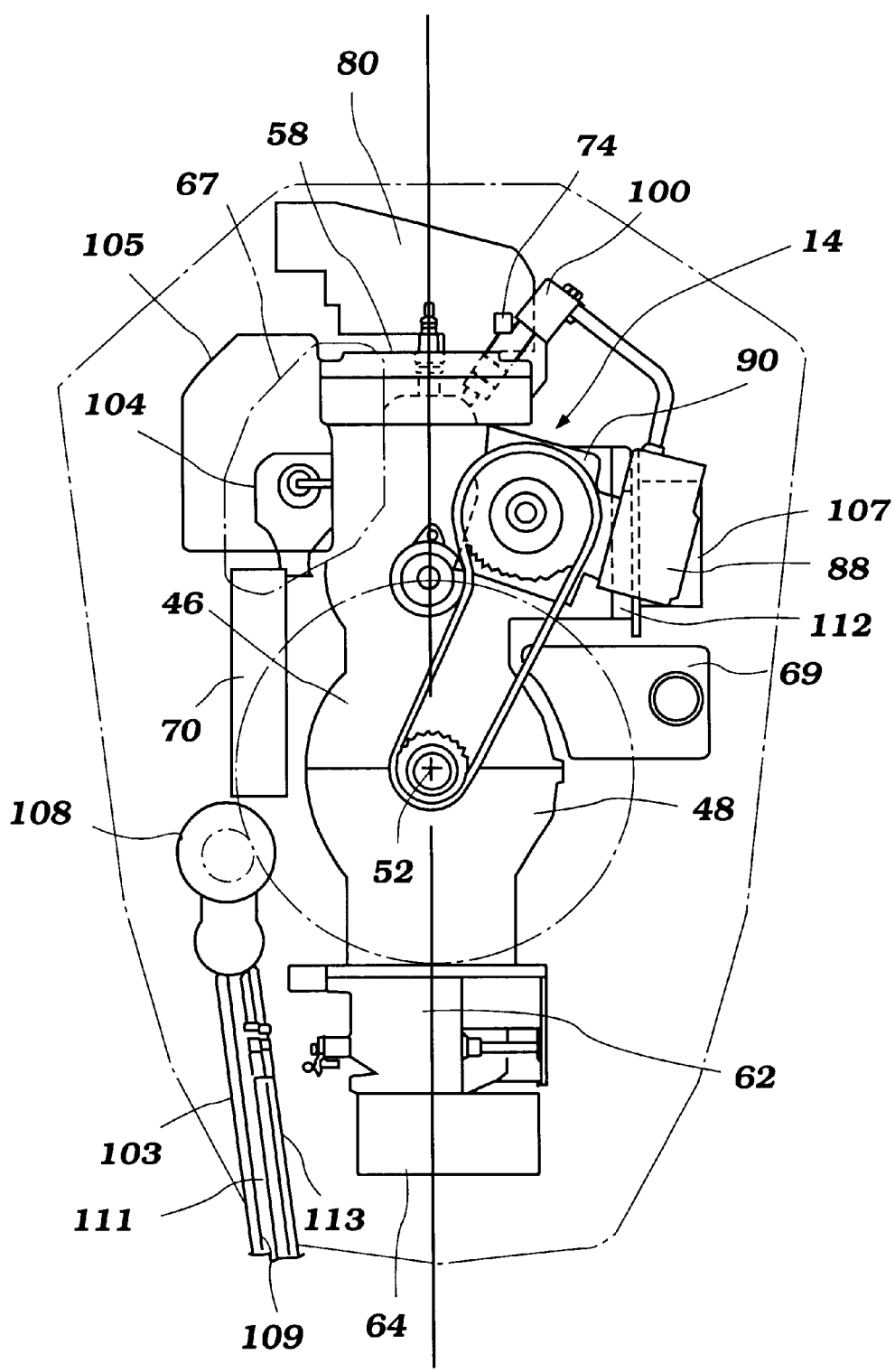
FIG. 9 is a top plan view illustrating a variation of the embodiment shown in FIG. 2.

With reference to FIG. 9, a further modification of the embodiment shown in FIG. 2 is illustrated therein. The engine layout shown in FIG. 9 is essentially identical to that shown in FIG. 2. However, in the engine layout shown in FIG. 9, the vapor separator is arranged behind the spark plugs 72. With this arrangement, the wedge-shaped upper cowling 120 preferably is used to cover the engine 14.

Figure 10:
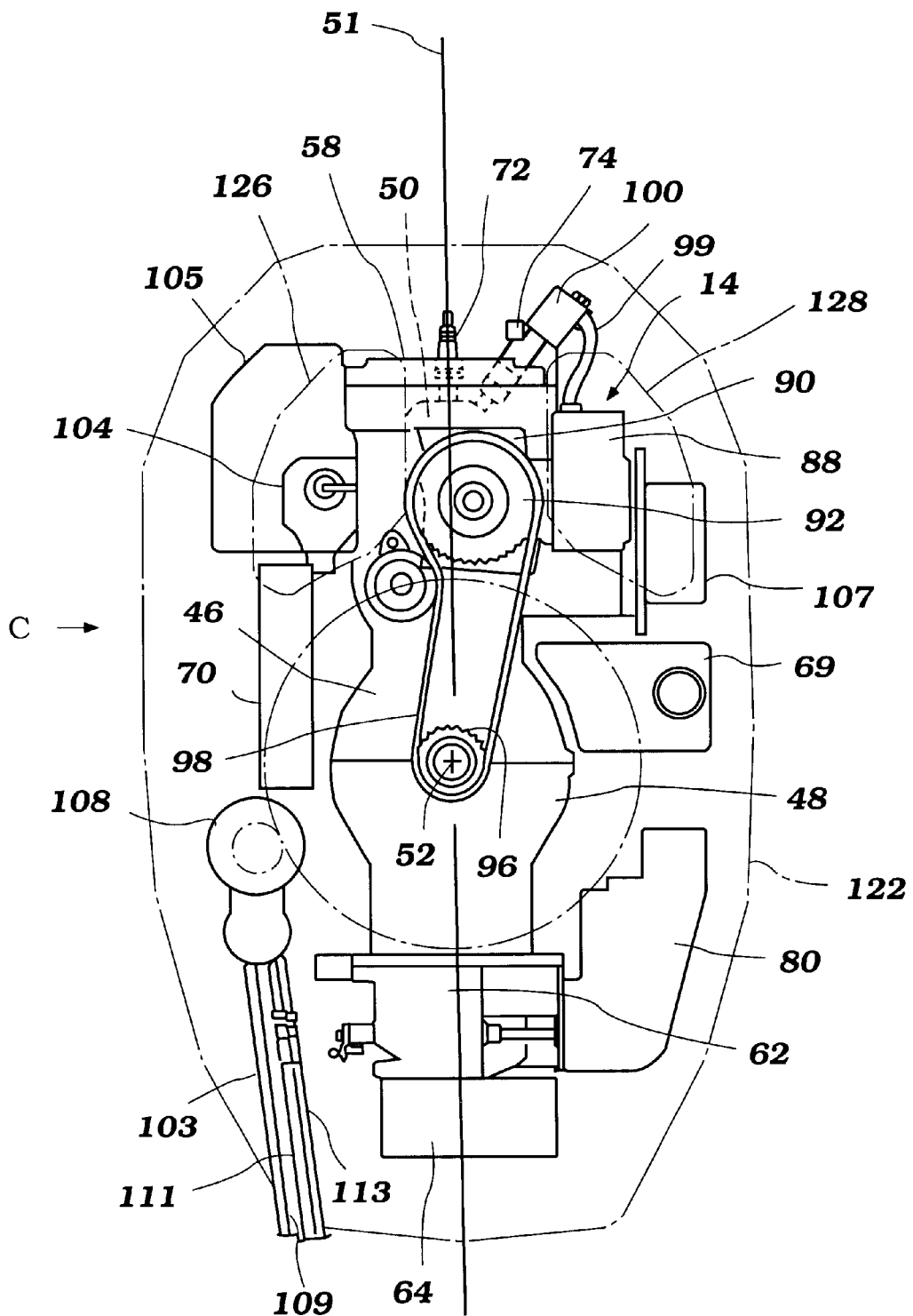
FIG. 10 is a top plan view of an additional embodiment of an engine constructed in accordance with the present invention.
Figure 11:
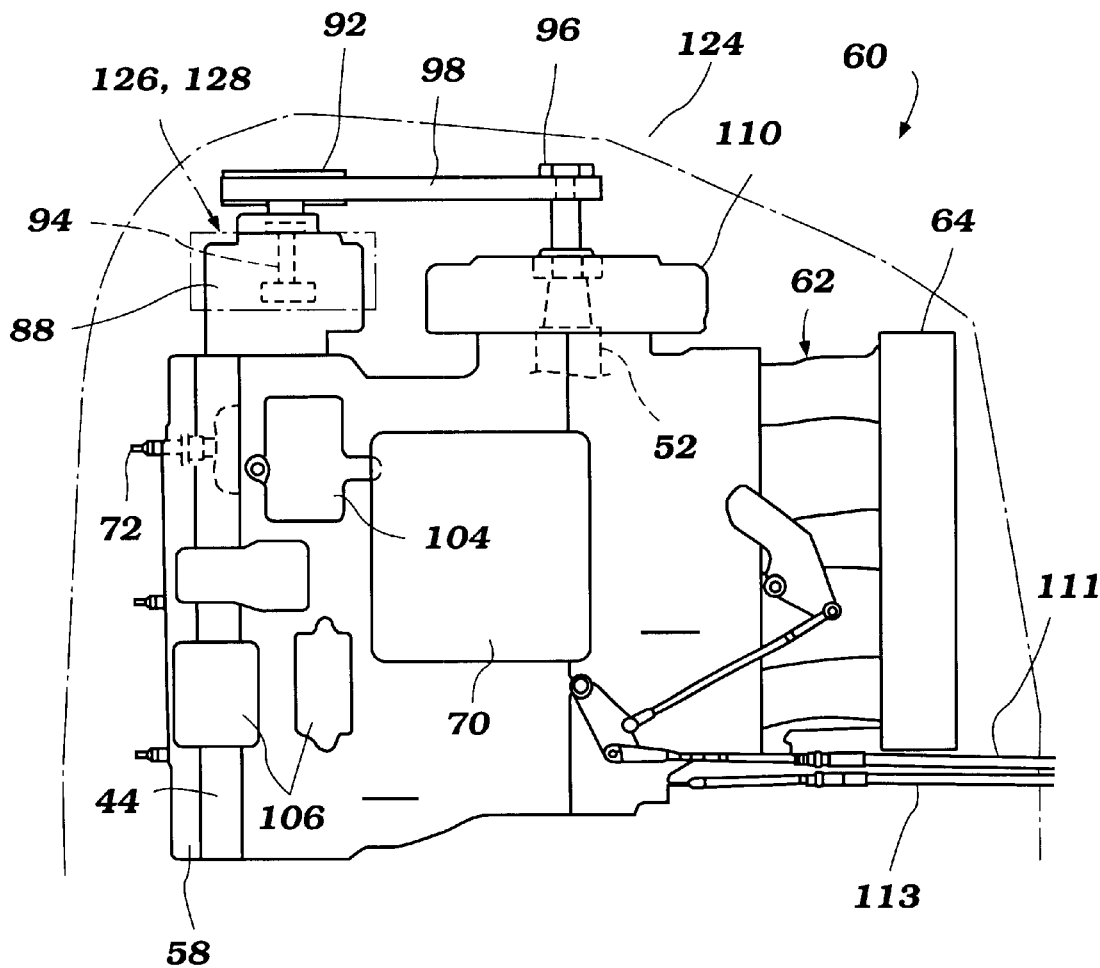
FIG. 11 is a right side elevational view of the engine, as viewed along arrow C shown in FIG. 10.

With reference to FIGS. 10 and 11, a second embodiment of the present invention will now be described. As shown in FIGS. 10 and 11, the layout of the various components of the engine 14, except for the arrangement of the high pressure pump unit 90 and the high pressure fuel pump 88, is the same as the layout shown in FIG. 2. As shown in FIG. 10, the drive unit 90 is arranged such that the input shaft 94 is in close proximity to the longitudinal axis 51 of the cylinder bores 50. As shown in FIG. 11, the pump drive unit 90 is mounted entirely above the engine body 42. The high pressure fuel pump 88 desirably is attached directly to the pump drive unit 90 via a plurality of bolts.

By positioning the pump drive unit 90 such that the input shaft 94 is in close proximity to the longitudinal axis 51 of the cylinder bores 50, the present invention allows the overall width of the engine 14 to be reduced since the pump drive unit 90 is entirely above the engine body 42.

Similar to the upper cowling 24, an upper cowling 122 desirably covers the engine 14 in a tight fitting relation so as to minimize the frontal area of the upper cowling 122.

As shown in FIG. 11, the upper cowling 122 includes a concave top portion 124 which is configured to enclose the pump drive unit 90, the drive pulleys 92 and 96, and the drive belt 98. As shown in FIG. 10, the upper cowling 122 also desirably includes two air vents 126 and 128.

With the input shaft 94 of the pump drive unit 90 arranged in close proximity to the longitudinal axis of the cylinder bores 50, the upper convex portion 124 of the upper cowling 122 may be sized so as to have a narrower width than the maximum width of the upper cowling 122. Therefore, the frontal area of the upper cowling 122 can be minimized.

Although this invention has been described in terms of certain preferred embodiments, other embodiments apparent to those of ordinary skill in the art are also within the scope of this invention. Accordingly, the scope of the invention is intended to be defined only by the claims that follow.

What is claimed is:

1. An outboard motor comprising a power head including a direct-injected internal combustion engine, and a cowling covering the engine, the engine having an output shaft and being mounted in the power head so that the output shaft rotates about a vertically extending axis, the engine including a plurality of cylinders each defining a longitudinal axis, and at least one fuel injector corresponding to each cylinder, a port provided on the cowling on a first side of the longitudinal axes, a relay box arranged on the first side and containing at least one electrical relay configured to selectively supply electrical current to at least one portion of the engine, at least one electrical conduit extending through the port and to the relay box, a high pressure fuel pump positioned on a second side of the longitudinal axes, opposite the first side, and a drive unit driven by the crankshaft and configured to drive the high pressure pump and arranged on the second side.

2. An outboard motor as set forth in claim 1, wherein the drive unit is offset from the longitudinal axes.

3. An outboard motor as set forth in claim 1, wherein the drive unit is arranged in close proximity to the longitudinal axes.

4. An outboard motor as set forth in claim 1 additionally comprising a vapor separator configured to supply the high pressure fuel pump with liquid fuel and arranged on the second side of the longitudinal axes.

5. An outboard motor as set forth in claim 4 wherein the vapor separator is arranged directly below the high pressure fuel pump.

6. An outboard motor as set forth in claim 1 additionally comprising a vapor separator being configured to supply the high pressure fuel pump with liquid fuel, at least a portion of the vapor separator being arranged on the second side of the longitudinal axes.

7. An outboard motor as set forth in claim 1 additionally comprising a low pressure fuel pump being configured to pump fuel from a fuel tank to the engine and being arranged on the second side of the longitudinal axes.

8. An outboard motor as set forth in claim 1 additionally comprising a fuel pre-pressure pump being configured to pump fuel to the high pressure fuel pump and being arranged on the second side of the longitudinal axes.

9. An outboard motor as set forth in claim 1 additionally comprising a fuel injector driver being configured to control the operation of the at least one fuel injector, at least a portion of the fuel injector driver being arranged on the second side of the longitudinal axes.

10. An outboard motor as set forth in claim 1 additionally comprising a ring gear mounted to the output shaft and a starter motor configured to engage the ring gear so as to rotate the output shaft, the starter motor being arranged on the first side of the longitudinal axes.

11. An outboard motor as set forth in claim 1, wherein the at least one fuel injector is arranged on the second side of the longitudinal axes.

12. An outboard motor as set forth in claim 11 additionally comprising a fuel rail configured to supply the at least one fuel injector with pressurized fuel and arranged on the second side of the longitudinal axes.

13. An outboard motor as set forth in claim 1 additionally comprising an electronic control unit configured to control at least one aspect of the engine operation and being arranged on the first side of the longitudinal axes.

14. An outboard motor comprising a power head including a direct-injected internal combustion engine, and a cowling covering the engine, the engine having an output shaft and being mounted in the power head so that the output shaft rotates about a vertically extending axis, the engine including at least one cylinder defining a longitudinal axis, an electrical system arranged substantially on a first side of the longitudinal axis and a fuel delivery system having at least one fuel injector configured to deliver fuel to the at least one cylinder, a high pressure fuel pump configured to supply fuel to the at least one fuel injector, and a drive unit driven by the crankshaft and configured to drive the high pressure fuel pump, the drive unit being positioned substantially on a second side of the longitudinal axis, opposite the first side.

15. An outboard motor as set forth in claim 14, wherein the drive unit is offset from the longitudinal axis.

16. An outboard motor as set forth in claim 14, wherein the drive unit is arranged in close proximity to the longitudinal axis.

17. An outboard motor as set forth in claim 14 additionally comprising a vapor separator configured to supply the high pressure fuel pump with liquid fuel and being arranged on the second side of the longitudinal axis.

18. An outboard motor as set forth in claim 17, wherein the vapor separator is arranged directly below the high pressure fuel pump.

19. An outboard motor as set forth in claim 14 additionally comprising a low pressure fuel pump being configured to pump fuel from a fuel tank to the fuel delivery system and being arranged on the second side of the longitudinal axis.

20. An outboard motor as set forth in claim 14 additionally comprising a fuel pre-pressure pump configured to pump fuel to the high pressure fuel pump and being arranged on the second side of the longitudinal axis.

21. An outboard motor as set forth in claim 14 additionally comprising a fuel injector driver configured to control the operation of the at least one fuel injector, at least a portion of the fuel injector driver being arranged on the second side of the longitudinal axis.

22. An outboard motor as set forth in claim 14 additionally comprising a ring gear mounted to one end of the crankshaft, and a starter motor being configured to engage the ring gear so as to rotate the output shaft and being arranged on the first side of the longitudinal axis.

23. An outboard motor as set forth in claim 14, wherein the at least one fuel injector is arranged on the second side of the longitudinal axis.

24. An outboard motor as set forth in claim 23 additionally comprising a fuel rail configured to supply the at least one fuel injector with pressurized fuel and being arranged on the second side of the longitudinal axis.

25. An outboard motor as set forth in claim 14 additionally comprising an electronic control unit configured to control at least one aspect of the engine operation, at least a portion of the electronic control unit being arranged on the first side of the longitudinal axis.

26. An outboard motor as set forth in claim 25 additionally comprising a relay box containing at least one relay configured to selectively supply electrical current to at least one portion of the engine, the relay box being arranged on the first side of the longitudinal axis, a port provided on the cowling and on the first side of the longitudinal axis, and at least one electrical conduit extending through the port to the relay box.

* * * * *

UNITED STATES PATENT AND TRADEMARK OFFICE
CERTIFICATE OF CORRECTION

PATENT NO. : 6,390,071 B1
DATED : May 21, 2002
INVENTOR(S) : Hiroshi Nakai et al.

It is certified that error appears in the above-identified patent and that said Letters Patent is hereby corrected as shown below:

<u>Title page,</u>
Item [30], Foreign Application Priority Data, please add the following:
-- September 3, 1997  (JP)............9-238118
   September 3, 1997  (JP)............9-238508
   September 3, 1997  (JP)............9-238509 --

Signed and Sealed this

Twenty-third Day of March, 2004

JON W. DUDAS
*Acting Director of the United States Patent and Trademark Office*